(12) United States Patent
Landsbeck et al.

(10) Patent No.: US 10,393,217 B2
(45) Date of Patent: Aug. 27, 2019

(54) PERSON-CONVEYING DEVICE WITH AN ADAPTIVE VIBRATION-DAMPING SYSTEM, AND METHOD FOR REDUCING BUILDING VIBRATIONS TRANSMITTED TO PERSON-CONVEYING DEVICES

(71) Applicants: THYSSENKRUPP ELEVATOR AG, Essen (DE); thyssenkrupp AG, Essen (DE)

(72) Inventors: Patrick Landsbeck, Kelsterbach (DE); Hanna Keitzel, Hamburg (DE); Detlev Lindemeier, Reinbek (DE)

(73) Assignees: THYSSENKRUPP ELEVATOR AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/752,731

(22) PCT Filed: Aug. 8, 2016

(86) PCT No.: PCT/EP2016/068854
§ 371 (c)(1),
(2) Date: Feb. 14, 2018

(87) PCT Pub. No.: WO2017/029144
PCT Pub. Date: Feb. 23, 2017

(65) Prior Publication Data
US 2018/0231095 A1    Aug. 16, 2018

(30) Foreign Application Priority Data
Aug. 14, 2015   (DE) .................. 10 2015 215 531

(51) Int. Cl.
*F16F 15/00*   (2006.01)
*B66B 25/00*   (2006.01)
(Continued)

(52) U.S. Cl.
CPC .......... *F16F 15/002* (2013.01); *B66B 25/003* (2013.01); *B66B 25/006* (2013.01);
(Continued)

(58) Field of Classification Search
CPC ..... B66B 23/00; B66B 25/003; B66B 25/006; F16F 15/005; F16F 9/535; F16F 15/03; F16F 2222/06
(Continued)

(56) References Cited

U.S. PATENT DOCUMENTS 4,922,667 A    5/1990   Kobori
5,036,633 A    8/1991   Kobori
(Continued)

FOREIGN PATENT DOCUMENTS

CN    201857195 U     6/2011
EP     1262440 A     12/2002
(Continued)

OTHER PUBLICATIONS

English Translation of International Search Report issued in PCT/EP2015/068655, dated Oct. 13, 2015 (dated Oct. 20, 2015).

*Primary Examiner* — Gene O Crawford
*Assistant Examiner* — Lester Rushin, III
(74) *Attorney, Agent, or Firm* — thyssenkrupp North America, Inc.

(57) ABSTRACT

A person-conveying device that connects a first story of a building to a second story of the building may include a supporting framework with a carrier element and an adaptive vibration-damping system. The carrier element allows the person-conveying device to be connected to the building via the adaptive vibration-damping system. A method for reducing the transmission of vibrations from the building to the person-conveying device that is connected to the building may involve the adaptive vibration damping system.

(Continued)

Vibration data may be detected outside the person-conveying device, and the detected vibration data may be evaluated. Vibration damping of the vibration-damping system may then be adapted based on the evaluated vibration data.

18 Claims, 3 Drawing Sheets

(51) Int. Cl.
 *F16F 9/53* (2006.01)
 *F16F 15/03* (2006.01)
(52) U.S. Cl.
 CPC ............. *F16F 9/535* (2013.01); *F16F 15/03* (2013.01); *F16F 2222/06* (2013.01); *F16F 2224/045* (2013.01); *F16F 2230/0011* (2013.01)
(58) Field of Classification Search
 USPC ........................................................ 198/323
 See application file for complete search history.

(56) References Cited

U.S. PATENT DOCUMENTS

| | | | |
|---|---|---|---|
| 5,993,358 A * | 11/1999 | Gureghian | A63B 22/02 482/54 |
| 6,129,198 A | 10/2000 | Nusime | |
| 2003/0102198 A1 * | 6/2003 | Nusime | B66B 21/00 198/321 |
| 2005/0061607 A1 | 3/2005 | Krampl | |

FOREIGN PATENT DOCUMENTS

| | | |
|---|---|---|
| JP | H0958956 A | 3/1997 |
| JP | 2006103825 A | 4/2006 |
| JP | 2013241227 A | 12/2013 |
| KR | 101096780 B | 12/2011 |
| WO | 0210054 A | 3/1997 |

\* cited by examiner

PERSON-CONVEYING DEVICE WITH AN ADAPTIVE VIBRATION-DAMPING SYSTEM, AND METHOD FOR REDUCING BUILDING VIBRATIONS TRANSMITTED TO PERSON-CONVEYING DEVICES

CROSS REFERENCE TO RELATED APPLICATIONS

This application is a U.S. National Stage Entry of International Patent Application Serial Number PCT/EP2016/068854, filed Aug. 8, 2016, which claims priority to German Patent Application No. DE 10 2015 215 531.5, filed Aug. 14, 2015, the entire contents of both of which are incorporated herein by reference.

FIELD

The present disclosure generally relates to person conveying devices, including escalators used in multilevel buildings.

BACKGROUND

As a result of attaching person-conveying devices to buildings, vibrations can be transmitted from the person-conveying device to the building and, accordingly, also from the building to the person-conveying device. Building vibrations can be triggered in particular by earthquakes in seismically active regions. The building vibrations arising can cause damage to the person-conveying device and even lead to the person-conveying device collapsing. It is therefore desirable to provide appropriate protective measures that are suitable to make a person-conveying device more robust with respect to building vibrations, in particular more robust to building vibrations caused by earthquakes.

For this purpose, an earthquake-resistant support for escalators or moving walkways is disclosed in the document WO 02/10054 A. Supports are provided for the building-side support at escalator ends or moving-walkway ends. These constructions do not reduce or at least do not substantially reduce the transmission of vibrations from the building to the escalator or the moving walkway.

Additionally, JP H0958956 discloses an upper support for an escalator, which is secured against longitudinal movements which are triggered by earthquakes. This construction is also not used substantially for the reduction of building vibrations transmitted to the escalator.

Furthermore, the document CN 201857195 U discloses an escalator which provides for seismic inhibition between building and escalator. In a way similar to the aforementioned support, this inhibition is intended to permit a certain displacement of the escalator on the supporting structure of the building. Vibrations can continue to be transmitted from the building to the escalator.

Furthermore, in order to reduce vibrations generated by the chain engagement of an escalator or a moving walkway, the document EP 1 262 440 A1 discloses an escalator or a moving walkway having a vibration damper, which is connected to the escalator or to the moving walkway within a self-supporting region. The escalator or the moving walkway is, however, not adapted to transmit vibrations from the building in a reduced manner to the escalator or the moving walkway. There is thus no particular safeguard which would prevent transmission of building vibrations that occur to the escalator, in particular upon the occurrence of an earthquake.

Thus a need exists to improve a person-conveying device, in particular in such a way that the same is better protected against damage by earthquakes and seismic loadings acting on the person-conveying device are reduced.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to person-conveying devices such as escalators, which connect a first level of a building, in particular a first story of a building, to a second level of the building, in particular to a second story of the building. In some examples, the person-conveying device may comprise a truss having at least one supporting element for arrangement on the building. Arranged in the truss there may be an endless transport belt formed from a multiplicity of tread elements connected to one another, such as an endless step belt formed from a multiplicity of steps, for example. A balustrade with handrail and cladding elements may be arranged on the truss.

The solution proposed provides a person-conveying device, in particular an escalator, which connects a first level of a building, in particular a first storey of a building, to a second level of the building, in particular a further storey of a building. The person-conveying device comprises a truss having at least one supporting element and at least one adaptive vibration damping system, wherein the person-conveying device is connected to the building by the at least one supporting element via the at least one adaptive vibration damping system. Provision is in particular made for the person-conveying device to be at least partly self-supporting.

In particular, provision is made that, between the respective ends of the person-conveying device, a multiplicity of interconnected tread elements form an endless transport belt, which is driven by at least one drive unit, for example an asynchronous motor, and is arranged within the truss. If the person-conveying device is an escalator, the transport belt is a step belt formed from a multiplicity of interconnected steps. If the person-conveying device is a moving walkway, the transport belt is a pallet belt formed from a multiplicity of interconnected pallets.

The truss of the person-conveying device advantageously has a framework structure. In particular, provision is made for a balustrade, in particular a balustrade having a driven endless handrail, to be arranged on the truss. Furthermore, panels, in particular aluminum plates, are in particular arranged on the truss.

Since the at least one vibration damping system of the person-conveying device is adapted to be adaptive, that is to say in particular can be adapted to vibrations and/or shocks that occur, the at least one vibration damping system is advantageously adapted to damp differently pronounced vibrations. This means in particular that the at least one vibration damping system is not set fixedly but is adapted or can be adapted to the vibrations that occur. Thus, the at least one vibration damping system can advantageously react to different vibrations, in particular both to vibrations with a pronounced amplitude and low frequency and also to vibrations with a less pronounced amplitude at a high frequency, and also to superimposed vibrations, such that these vibrations are compensated or at least reduced.

Advantageously, the at least one adaptive vibration damping system of the person-conveying device is adapted to reduce or to suppress transmission of vibrations from the building to the person-conveying device. Building vibrations are in particular building vibrations brought about by seismic activity, in particular on account of earthquakes. Without an adaptive vibration damping system, the building vibrations caused by an earthquake would be transmitted directly to the person-conveying device. In order to be able to withstand these loadings, it would be necessary for the person-conveying device to be constructed more complicatedly in design terms. If the person-conveying device were to have a vibration damping system which, however, was not adapted adaptively, there would additionally be the risk that resonances would occur and, as a result of the non-adaptive vibration damping system, the building vibrations would even act more intensely on the person-conveying device. On the other hand, because vibrations from the building are kept away from the person-conveying device to the greatest possible extent, as a result of the adaptive vibration damping system, a person-conveying device adapted in accordance with the invention is advantageously considerably better protected against damage from earthquakes.

In particular, provision is made for the at least one adaptive vibration damping system to be adaptable with regard to the amplitude and/or the frequency of occurring vibrations, in particular with regard to the amplitude and/or the frequency of vibrations occurring outside the truss of the person-conveying device. Therefore, the at least one adaptive vibration damping system is advantageously further better adapted to damp vibrations of the building adequately in each case and thus to reduce the loadings acting on the person-conveying device as a result of building vibrations.

Advantageously, as a result of the at least one adaptive vibration damping system, the person-conveying device can be constructed in such a way that the person-conveying device has to withstand lower loading peaks, which advantageously leads to a reduction in weight and costs, in particular in the manufacture of the truss of the person-conveying device.

According to a particularly advantageous embodiment of the person-conveying device according to the invention, the at least one adaptive vibration damping system is adapted to receive and evaluate vibration data with respect to vibrations occurring outside the person-conveying device, and to adapt the damping action in particular on the basis of the received vibration data. Vibrations occurring outside the person-conveying device are in particular vibrations of the building. Furthermore, further vibrations occurring outside the person-conveying device, in particular in the direct vicinity of the building, in particular within a radius of up to 1000 m (m: meter) around the building, and in the further surroundings of the building, in particular within a radius of up to 100 km (km: kilometer) around the building, are vibrations that occur which are of seismic origin.

To receive the vibration data, according to an advantageous embodiment the at least one adaptive vibration damping system comprises at least one receiving unit. The vibration data can in particular be received wirelessly, in particular via an air interface, and/or in a line-bound manner.

To evaluate the vibration data, according to a further advantageous embodiment the at least one adaptive vibration damping system comprises at least one evaluation unit. In particular, the evaluation unit provided can be an appropriately programmed microcontroller circuit. The vibration data is advantageously evaluated in particular with regard to the respective amplitude of detected vibrations and/or with regard to the respective frequency of detected vibrations and/or with regard to the anticipated impingement of vibrations detected outside the person-conveying device, in particular of vibrations detected within a radius of up to 100 km around the building, on the person-conveying device and/or with regard to a prediction of building vibrations originating from seismic vibrations detected outside the building, in particular of seismic vibrations detected within a radius of up to 100 km around the building.

Advantageously, the at least one adaptive vibration damping system is adapted to adapt the vibration damping action whilst taking the results of the evaluation of the received vibration data into account. In particular, provision is made for the adaptive vibration damping system to comprise actuating means for this purpose, which are actuated in accordance with the result of the evaluation and which influence the damping action of the at least one adaptive vibration damping system. In particular, provision is made for each damper element of the at least one vibration damping system to be actuated by a dedicated actuating means. According to another embodiment, the activation of the individual damping elements of the at least one vibration damping system is carried out via a central actuating element. The central actuating element is advantageously adapted to activate each damping element individually.

According to a further advantageous embodiment of the invention, the person-conveying device comprises at least one detection unit arranged outside the person-conveying device for the detection of vibration data, in particular for the detection of seismic activity and/or for the detection of vibrations of the building as vibration data. In particular, such a detection unit can be a seismograph. By means of this at least one detection unit, vibrations are advantageously detected so early that the adaptive vibration damping system can be adjusted to these vibrations, so that these vibrations are not transmitted, or at least transmitted in a manner damped by the vibration damping system, to the person-conveying device. In particular if the person-conveying device is operated without relevant seismic activity, in particular when no vibrations are detected by the at least one detection unit, the at least one adaptive vibration damping system is advantageously adapted to reduce vibrations which are generated by the operation of the person-conveying device, so that the escalator exhibits improved smooth running.

A further advantageous embodiment provides for the person-conveying device to comprise at least one transmission means for transmitting the detected vibration data to the at least one vibration damping system. In particular, a radio transmitter is provided as transmission means. Advantageously, the at least one transmission means is adapted to transmit the detected vibration data via a mobile radio network to the at least one receiving unit of the at least one vibration damping system.

According to a further particularly advantageous embodiment of the invention, the at least one adaptive vibration damping system comprises at least one MRF damper (MRF: magnetorheologial fluid). In particular, provision is made for the at least one adaptive vibration system to comprise a multiplicity of MRF dampers. These MRF dampers advantageously operate with a specific magnetorheological damper oil. The fact that the damper oil comprises tiny metal particles which can be polarized magnetically means that a magnetic field is formed in the damper as a result of appropriate electric activation. By means of a magnetic field, the viscosity of the damper oil and therefore the damping action of the damper can advantageously be adapted.

As an another advantageous embodiment of the invention, provision is in particular made for the at least one adaptive vibration damping system to comprise at least one first adaptive damper, which is arranged between the building and the at least one supporting element in such a way that it damps vibrations with respect to a first spatial direction. Advantageously, in this way vibrations in a first direction of movement (1st translation) of the person-conveying device are damped.

As an advantageous development of this embodiment, provision is in particular made for the at least one adaptive vibration damping system to comprise at least one second adaptive damper, which is arranged between the building and the at least one supporting element in such a way that it damps vibrations with respect to a second spatial direction, wherein this second spatial direction is orthogonal to the first spatial direction. Advantageously, in this way vibrations in a first direction of movement (1st translation) of the person-conveying device and in a second direction of movement (2nd translation) of the person-conveying device are damped.

As a further advantageous development of this embodiment, provision is in particular made for the at least one adaptive vibration damping system to comprise at least one third adaptive damper, which is arranged between the building and the at least one supporting element in such a way that it damps vibrations with respect to a third spatial direction, wherein this third spatial direction is orthogonal to the first spatial direction and orthogonal to the second spatial direction. Advantageously, in this way vibrations in a first direction of movement (1st translation) of the person-conveying device and in a second direction of movement (2nd) translation) of the person-conveying device and in a third direction of movement (3rd translation) of the person-conveying device are damped. In this embodiment, the person-conveying device is advantageously particularly well protected against damage from building vibrations.

According to a further particularly advantageous embodiment of the invention, provision is made for the truss to have a first supporting element and a second supporting element as the at least one supporting element, and for the person-conveying device to have a first adaptive vibration damping system and a second adaptive vibration damping system as the at least one adaptive vibration damping system, wherein the person-conveying device is connected by the first supporting element to the first level of the building via the first adaptive vibration damping system, and is connected by the second supporting element to the second level of the building via the second adaptive vibration damping system. Advantageously, in this way the transmission of vibrations to the person-conveying device is particularly well reduced.

In particular, provision is made for the first level of the building to be a first storey of the building and for the second level of the building to be a second storey of the building, which is lower in comparison to the first storey or is higher in comparison to the first storey. The person-conveying device is advantageously connected to the first storey via at least one first supporting element, wherein the first adaptive vibration damping system is arranged between the first storey and the at least one first supporting element. In addition, the person-conveying device is advantageously connected to the second storey via at least one second supporting element, wherein the second adaptive vibration damping system is arranged between the second storey and the at least one second supporting element. If the person-conveying device is a moving walkway, then the first level can have the same height as the second level.

An advantageous development of the invention provides for the first supporting element to be a first supporting angle and for the second supporting element to be a second supporting angle, wherein adaptive dampers are arranged with respect to the building respectively at the side, at the front and underneath the respective supporting angle. Advantageously, vibrations that occur are damped by the adaptive dampers in all three translational directions of movement of the person-conveying device. Building vibrations are thus advantageously not transmitted or at least transmitted in a reduced manner to the person-conveying device, irrespective of their direction of action.

The method proposed in order to solve the object mentioned at the beginning of reducing the transmission of vibrations from a building to a person-conveying device connecting a first level of this building to a second level of this building, which is connected to the building via at least one adaptive vibration damping system, provides in particular for vibration data to be detected outside the person-conveying device, in particular vibrations of the building and seismic data as vibration data, and for the detected vibration data to be evaluated and for the vibration damping of the at least one adaptive vibration damping system to be adapted on the basis of the evaluated vibration data. The person-conveying device is preferably adapted in accordance with a person-conveying device according to the invention mentioned above. This person-conveying device can in particular have the features described as advantageous individually or in combination.

In particular, provision is made, in the method according to the invention, for the at least one adaptive vibration damping system to be adapted whilst taking the amplitude and/or the frequency of detected vibrations into account.

With respect to vibrations that occur, vibration data is advantageously detected by means of at least one detection unit, in particular by means of a seismograph. In particular, vibrations of the building and/or seismic activities are detected as vibration data. The vibration data is advantageously detected in a radius of up to 100 km around the building having the person-conveying device.

Detected vibration data is advantageously transmitted to the at least one adaptive vibration damping system by using at least one transmission means, in particular a transceiver unit. Transmitted vibration data is received by the at least one receiving unit of the at least one adaptive vibration damping system and provided to at least one evaluation unit of the at least one adaptive vibration damping system. This at least one evaluation unit evaluates the received vibration data. Whilst taking the results of the evaluation into account, the adaptive dampers of the at least one adaptive vibration damping system are then activated, preferably via corresponding actuating elements. Advantageously, the at least one vibration damping system is so well adapted to building vibrations that occur that building vibrations are not transmitted or are transmitted at least in only highly reduced form to the person-conveying device.

Figure 1:
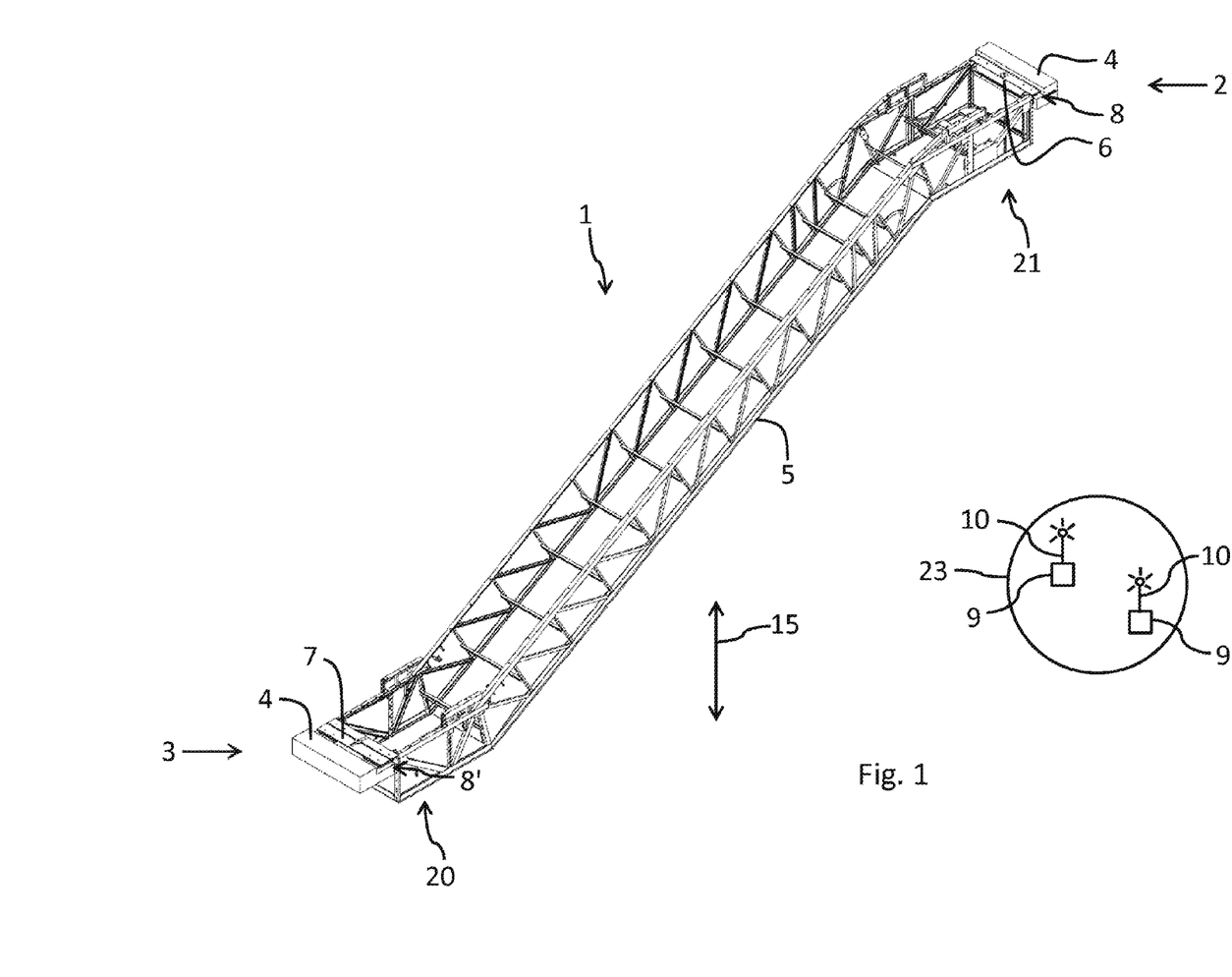
FIG. 1 is a perspective view of an example person-conveying device without a transport belt.

In the exemplary embodiment shown in FIG. 1, the person-conveying device 1 is designed as a partially self-supporting escalator, the truss 5 being illustrated as a substantial component of the person-conveying device. Arranged in the truss 5, for conveying individuals, there is usually an endless step belt formed from a multiplicity of interconnected steps, together with an appropriate drive unit and gear elements. Also usually arranged on the truss 5 are a balustrade with driven handrails and cladding of the truss. Since this arrangement of transport, drive and gear unit as well as balustrade with handrails and cladding is sufficiently well-known in the prior art and does not form the focus of the invention, this arrangement is not illustrated in FIG. 1. The truss 5 in the exemplary embodiment has a framework structure.

As illustrated schematically in FIG. 1, the person-conveying device 1 connects a first level 2 of a building 4 to a second level of the building 4. For reasons of improved clarity, from the building 4, in each case only part of the supporting structure of the building 4 is illustrated in FIG. 1.

The first level 2 of the building can be a storey of the building 4. The second level 3 in the exemplary embodiment illustrated in FIG. 1 is a further, lower storey.

The truss 5 of the person-conveying device 1 according to the exemplary embodiment illustrated in FIG. 1 comprises a first supporting element 6 at its upper end 21, and a second supporting element 7 at its lower end 20. The supporting elements 6, 7 can in particular be designed as supporting angles. Furthermore, the person-conveying device 1 comprises a first adaptive vibration damping system 8 at its upper end 21 (details are not shown explicitly in FIG. 1), and a second adaptive vibration damping system 8' at its lower end 20 (details are not shown explicitly in FIG. 1). The person-conveying device 1 is connected to the building 4 by the first supporting element 6 via the first adaptive vibration damping system 8, and is connected to the building 4 by the second supporting element 7 via the second adaptive vibration damping system 8'.

The first adaptive vibration damping system 8 and the second adaptive vibration damping system 8' are each adapted to reduce transmission of vibrations from the building 4 to the person-conveying device 1, in particular when the building 4 is set vibrating on account of an earthquake. In particular, the vibration damping systems 8, 8' are adaptable with respect to the amplitude and frequency of vibrations occurring outside the truss 5, that is to say in particular vibrations of the building or vibrations which occur in a predefined radius around the building 4. This means that the vibration damping systems 8, 8' can each be adapted to vibrations that occur in such a way that the vibration damping systems 8, 8' at least partly absorb vibrations of the building 4. Vibrations of the building 4 are thus advantageously not transmitted or at least transmitted in a considerably reduced form to the truss 5 and thus to the person-conveying device 1. It goes without saying that the at least one vibration damping system of the person-conveying device 1 is provided such a reduction of transmission of vibrations from the building 4 to the person-conveying device 1 in the event of an earthquake only up to a specific strength on the Richter scale. In particular in the case of slight to moderate tremors, however, damage to the person-conveying device 1 can advantageously be prevented by the at least one adaptive vibration damping system.

In the exemplary embodiment illustrated in FIG. 1, the first vibration damping system 8 and the second vibration damping system 8' each comprise, for example, a first adaptive damper (not explicitly shown in FIG. 1). These adaptive dampers can in particular be magnetorheological dampers (MRF dampers), the damping properties of which change on the basis of electrical activation. The adaptive dampers are respectively arranged between the building 4 and the first supporting element 6 and also between the building 4 and the second supporting element 7, in such a way that these dampers can adaptively damp vibrations with respect to a first spatial direction 15.

The first vibration damping system 8 and the second vibration damping system 8' of the person-conveying device 1 are additionally adapted to receive vibration data with respect to vibrations occurring outside the person-conveying device and to evaluate the received vibration data. For this purpose, the vibration damping systems 8, 8' each have a receiving unit (not explicitly shown in FIG. 1), for example a receiving modem, and an evaluation unit (likewise not explicitly shown in FIG. 1), for example an appropriately programmed microcontroller circuit. Depending on the results of the evaluation, the adaptive dampers of the vibration damping systems 8, 8' are then activated.

If a person-conveying device 1 has a plurality of adaptive vibration damping systems, provision can also be made in particular for these to comprise a common receiving and evaluation unit.

To detect seismic activity as vibration data, the person-conveying device 1 illustrated by way of example in FIG. 1 comprises detection units 9, in particular seismographs. In FIG. 1, two detection units 9 are illustrated by way of example. The person-conveying device 1 preferably comprises more than two detection units, however, in particular between 10 and 30 detection units. These detection units 9 are advantageously arranged in the surroundings 23 (illustrated symbolically in FIG. 1 by a circle) of the building 4. The surroundings of the building 4 in particular include a radius of up to 100 km around the building 4. In particular, sensors fitted to the building 4 for detecting building vibrations are provided as further detection units (not explicitly shown in FIG. 1).

To transmit the vibration data detected by means of the detection units 9, the person-conveying device 1 additionally comprises transmission means 10 connected to the detection units 9, in particular transmitting modems. Thereby transmission of the vibration data is provided in particular via a mobile radio network. By means of the transmitting means 10, the vibration data is transmitted to the receiving units of the person-conveying device 1 or to the adaptive vibration damping systems 8, 8'.

In particular as a design variant, provision can be made for the receiving units of the person-conveying device 1 illustrated in FIG. 1 to retrieve or receive vibration data from the surroundings 23 of the building 4 from a central location, in particular a server having an appropriate database, and to provide said data to the evaluation units. Vibration data detected in the surroundings 23 of the building 4 is not transmitted directly to the person-conveying device 1 but to the central location, from which the vibration data is then transmitted to the person-conveying device or the receiving unit of the at least one adaptive vibration damping system.

Figure 2:
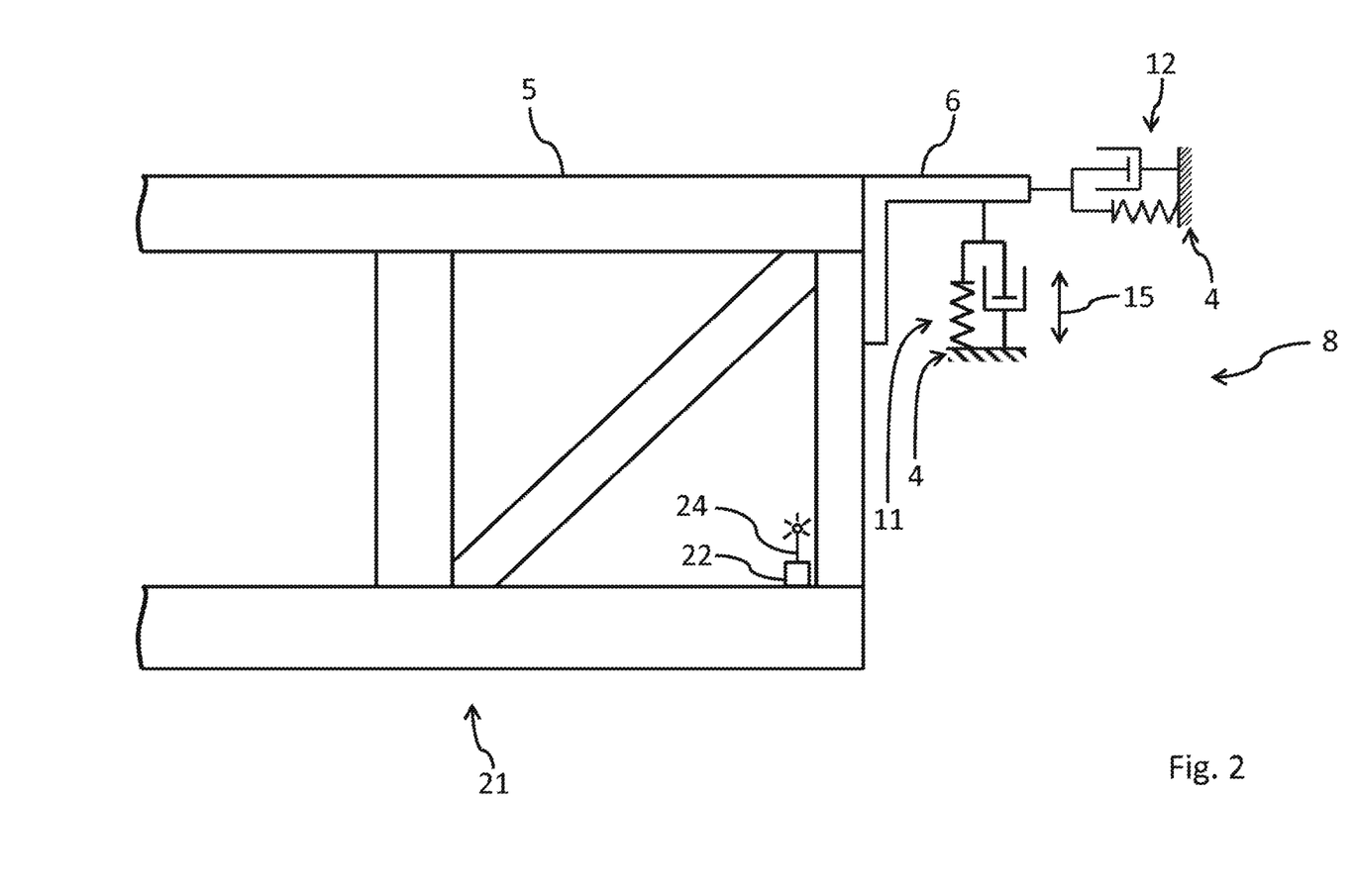
FIG. 2 is a simplified schematic view of an example end region of a person-conveying device.
Figure 3:
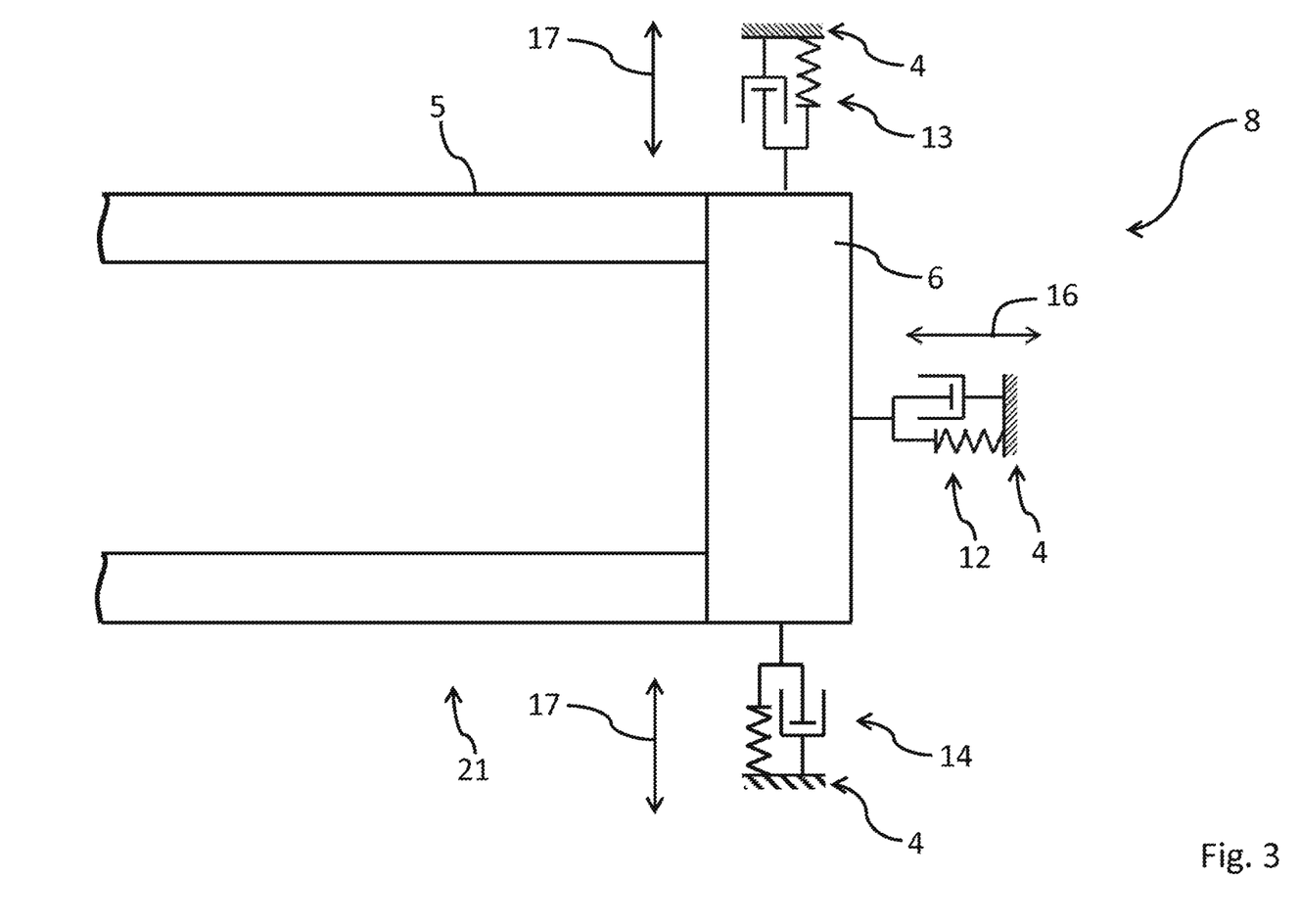
FIG. 3 is a simplified schematic plan view of an example end region of the person-conveying device of FIG. 2.

With reference to FIG. 2 and FIG. 3, a further exemplary embodiment of a person-conveying device adapted in accordance with the invention will be explained in more detail. The person-conveying device can be an escalator or a moving walkway. FIG. 2 shows a side view of an upper end 21 of a person-conveying device. A plan view of the upper end 21 of the person-conveying device is illustrated in FIG. 3.

As FIG. 2 and FIG. 3 each show, the person-conveying device comprises a truss 5, which, by means of steel profiles and struts extending vertically and diagonally, forms a framework structure. The truss 5 has a first supporting element 6 at the illustrated upper end 21 of the person-conveying device. The supporting element 6 is a supporting angle. At the lower end of the person-conveying device, not illustrated, the truss 5 has a second supporting angle as second supporting element. The lower end of the person-conveying device corresponds substantially to the upper end 21 of the person-conveying device with regard to its configuration, so that reference will not be made explicitly below to the lower end of the person-conveying device.

By using the supporting element 6, the person-conveying device is connected to the building 4 (merely shown simplified in FIG. 2 and FIG. 3 for reasons of clarity) at the upper end 21 via an adaptive vibration damping system 8 (merely shown schematically in FIG. 2 and FIG. 3). The vibration damping system 8 is adapted to reduce transmission of vibrations from the building 4 to the person-conveying device. For this purpose, a receiving unit 24 of the vibration damping system 8 receives vibration data which sensors (not shown explicitly in FIG. 2 and FIG. 3) detect on the building 4, and vibration data which is detected outside the building 4, in particular vibration data with respect to seismic activity within a radius of up to 100 km around the building 4.

The vibration data received by the receiving unit 24 is evaluated by the evaluation unit 22 of the vibration damping system 8. The vibration damping system 8 is then adapted whilst taking the result of the evaluation into account. The vibration damping system 8 in the exemplary embodiment comprises a plurality of adaptive dampers, which are each activated via actuating elements (not shown explicitly in FIG. 2 and FIG. 3) in accordance with the evaluation result, in order as well as possible to suppress the transmission of vibrations from the building 4 to the person-conveying device. The dampers can in particular be magnetorheological dampers.

The vibration damping system 8 comprises in particular a first adaptive damper 11, which is arranged underneath the supporting element 6 in relation to the building 4. This first damper 11 is arranged between the building 4 and the supporting element 5 in such a way that this damper 11 damps vibrations with respect to a first spatial direction 15.

Furthermore, the vibration damping system 8 comprises in particular a second damper 12, which is arranged on the front of the supporting element 6. This damper 12 is arranged between the building 4 and the supporting element 6 in such a way that this damper 12 damps vibrations with respect to a second spatial direction 16, wherein this second spatial direction 16 is orthogonal to the first spatial direction 15.

Furthermore, the vibration damping system 8 comprises in particular two third adaptive dampers 13, 14, which are arranged on the side of the supporting element 6. These dampers 13, 14 are arranged between the building 4 and the supporting element 6 in such a way that these dampers 13, 14 damp vibrations with respect to a third spatial direction, wherein this third spatial direction 17 is orthogonal to the first spatial direction 15 and orthogonal to the second spatial direction 16.

The exemplary embodiments illustrated in the figures and explained in conjunction therewith serve to explain the invention and are not restrictive of the latter.

LIST OF DESIGNATIONS

1 Person-conveying device
2 First level
3 Second level
4 Building
5 Truss
6 First supporting element
7 Second supporting element
8 First adaptive vibration damping system
8' Second adaptive vibration damping system
9 Detection unit
10 Transmission means
11 First damper
12 Second damper
13 Third damper
14 Fourth damper
15 Arrow to illustrate a first spatial direction
16 Arrow to illustrate a second spatial direction
17 Arrow to illustrate a third spatial direction
18 Evaluation unit
19 Receiving unit
20 Lower end
21 Upper end
22 Evaluation unit
23 Surroundings
24 Receiving unit

What is claimed is:

1. A person-conveying device that connects a first level of a building to a second level of the building, the person-conveying device comprising:
    a truss having a supporting element; and
    an adaptive vibration damping system, wherein the person-conveying device is connected to the building by the supporting element via the adaptive vibration damping system,
    wherein the adaptive vibration damping system is configured to receive and evaluate vibration data with respect to vibrations occurring outside the person-conveying device and to adapt damping action based on the received vibration data.

2. The person-conveying device of claim 1 wherein the adaptive vibration damping system is adapted to reduce transmission of vibrations from the building to the person-conveying device.

3. The person-conveying device of claim 1 wherein the adaptive vibration damping system is adaptable with regard to at least one of an amplitude or a frequency of vibrations occurring outside the truss.

4. The person-conveying device of claim 1 further comprising a detection unit disposed outside the truss and the adaptive vibration damping system for detecting vibration data based on at least one of seismic activity or vibrations of the building.

5. The person-conveying device of claim 4 further comprising a transmission means for transmitting the detected vibration data to the adaptive vibration damping system.

6. The person-conveying device of claim 1 wherein the adaptive vibration damping system comprises a magnetorheological fluid damper.

7. The person-conveying device of claim 1 wherein the adaptive vibration damping system comprises a first adaptive damper that is disposed between the building and the supporting element such that the first adaptive damper damps vibrations with respect to a first spatial direction.

8. The person-conveying device of claim 1 wherein the adaptive vibration damping system comprises a second adaptive damper that is disposed between the building and the supporting element such that the second adaptive damper damps vibrations with respect to a second spatial direction, the second spatial direction being orthogonal to the first spatial direction.

9. The person-conveying device of claim 1 wherein the adaptive vibration damping system comprises a third adaptive damper that is disposed between the building and the supporting element such that the third adaptive damper damps vibrations with respect to a third spatial direction, the third spatial direction being orthogonal to the first spatial direction and the second spatial direction.

10. The person-conveying device of claim 1 wherein the supporting element is a first supporting element and the adaptive vibration damping system is a first vibration damping system, wherein the truss comprises a second supporting element, wherein the person-conveying device comprises a second adaptive vibration damping system, wherein the person-conveying device is connected by the first supporting element to the first level of the building via the first adaptive vibration damping system and is connected by the second supporting element to the second level of the building via the second adaptive vibration damping system.

11. The person-conveying device of claim 10 wherein the first supporting element is a first supporting angle and the second supporting angle is a second supporting angle, wherein adaptive dampers are disposed with respect to the building, respectively, at a side, at a front, and underneath of the first and second supporting angles.

12. A method for reducing transmission of vibrations from a building to a person-conveying device connecting a first level of the building to a second level of the building, wherein the person-conveying device is connected to the building via an adaptive vibration damping system, the method comprising:

detecting vibration data outside the person-conveying device;

evaluating the vibration data; and adapting vibration damping of the adaptive vibration damping system based on the evaluation of the vibration data.

13. The method of claim 12 comprising adapting the adaptive vibration damping system with regard to at least one of an amplitude or a frequency of vibrations occurring outside the truss.

14. The method of claim 12 wherein the vibration data that is detected is based on at least one of seismic activity or vibrations of the building.

15. The method of claim 12 wherein adapting the vibration damping of the adaptive vibration damping system comprises adapting a viscosity of damper oil with which a magnetorheological fluid damper of the adaptive vibration damping system operates.

16. The method of claim 12 comprising damping vibrations in a first spatial direction and a second spatial direction, wherein the first spatial direction is orthogonal to the second spatial direction.

17. The method of claim 12 comprising damping vibrations in a first spatial direction, a second spatial direction, and a third spatial direction, wherein the first, second, and third spatial directions are all orthogonal to one another.

18. The method of claim 12 wherein the vibration damping system comprises a first vibration damping system disposed between the first level of the building and the person-conveying device, and a second vibration damping system disposed between the second level of the building and the person-conveying device, the method comprising:

damping vibrations between the person-conveying device and the first level of the building with the first vibration damping system; and damping vibrations between the person-conveying device and the second level of the building with the second vibration damping system.

* * * * *